United States Patent [19]

Sashida

[11] 4,325,264
[45] Apr. 20, 1982

[54] SUPERSONIC VIBRATION DRIVEN MOTOR DEVICE

[76] Inventor: Toshiiku Sashida, 1-8, Kasuya 2-chome, Setagaya-ku, Tokyo, Japan

[21] Appl. No.: 133,309

[22] Filed: Mar. 24, 1980

[51] Int. Cl.$^3$ .................... F16H 27/02; F16H 29/02
[52] U.S. Cl. ........................................ 74/88; 74/1 SS; 74/126; 74/128; 74/162; 310/323; 310/328
[58] Field of Search ............... 74/1 SS, 88, 111, 126, 74/128, 144, 162; 226/158, 162, 167, 63; 310/26, 323, 325, 328; 368/167

[56] References Cited

U.S. PATENT DOCUMENTS

| | | | |
|---|---|---|---|
| 2,608,092 | 8/1952 | Williamson | 74/126 X |
| 3,454,206 | 7/1969 | Williams | 226/162 |
| 3,612,373 | 10/1971 | Hermann | 226/167 X |
| 4,210,837 | 7/1980 | Vasiliev et al. | 310/323 |

FOREIGN PATENT DOCUMENTS

| | | | |
|---|---|---|---|
| 157611 | 12/1939 | Fed. Rep. of Germany . | |
| 1426227 | 10/1968 | Fed. Rep. of Germany | 74/88 |
| 2703661 | 8/1977 | Fed. Rep. of Germany . | |
| 306897 | 3/1972 | U.S.S.R. | 226/167 |
| 532947 | 2/1977 | U.S.S.R. | 310/323 |
| 570101 | 9/1977 | U.S.S.R. | 226/158 |
| 576648 | 10/1977 | U.S.S.R. | 310/323 |
| 623241 | 9/1978 | U.S.S.R. | 310/323 |

Primary Examiner—Lawrence J. Staab
Attorney, Agent, or Firm—Cushman, Darby & Cushman

[57] ABSTRACT

A supersonic vibration driven motor comprising a supersonic oscillator and a mass rotationally driven thereby. The oscillator is provided with a vibration disc secured thereto on an end face thereof opposite to the mass to be driven. The mass is integrally formed with a plurality of plate-shaped resilient vibratory pieces annularly arranged on the end face opposite to the oscillator and axially extending at a predetermined angle of inclination relative to the axis of the mass, the vibration disc and vibratory pieces being located so as to come in contact with each other at their end portions, whereby vibratory displacement of the supersonic oscillator is transformed into rotational movement of the mass by way of flexible deformation of the vibratory pieces. Alternatively, the resilient vibratory pieces may be formed integrally with the vibration disc. A plurality of supersonic oscillators may be annularly arranged and located so as to come in contact with the end face of the mass so that operational phases of the respective supersonic oscillators have a predetermined phase relationship ensuring even and smooth rotation. A plurality of supersonic oscillators integrally formed with vibratory pieces and arranged in linear alignment may be located so as to come in contact with a mass to be linearly driven, whereby vibratory displacement of the supersonic oscillators is transformed into linear movement of the mass by way of flexible deformation of the vibratory pieces.

9 Claims, 12 Drawing Figures (A)    (B)

SUPERSONIC VIBRATION DRIVEN MOTOR DEVICE

BACKGROUND OF THE INVENTION

1. Field of the Invention

The present invention relates to a supersonic vibration driven motor device, and more particularly relates to a motor device which is constructed such that vibratory displacement of the supersonic oscillator is transformed into rotational or linear movement of a mass to be driven by way of flexible deformation of vibratory pieces.

2. Brief Description of the Prior Art

Almost all conventional motor devices used in a variety of industries are driven by electromagnetic energy. In conventional motor devices, however, the dimensions, weight, rotary force (torque) and other factors are limited by the materials and structure of the devices. Since the characteristic functions of the motor device depend on magnetic properties, mechanical strength, and other characteristics of the materials used, it has been impossible to design and construct, in the hitherto known manner, a motor device having higher power in a smaller size than the conventional ones.

SUMMARY OF THE INVENTION

Hence, the present invention is intended to eliminate the drawbacks mentioned above associated with conventional motor devices. The principle of the invention lies in the fact that vibratory energy of a supersonic oscillator is transformed into rotational or linear movement of a mass to be driven by the flexible deformation of a number of plate-shaped resilient vibratory pieces.

In accordance with a first embodiment of the present invention, there is proposed a supersonic vibration driven motor device essentially comprising a supersonic oscillator and a mass to be rotationally driven by way of supersonic vibration, wherein the supersonic oscillator is provided with a vibration disc secured thereto on the end face thereof which is opposite to the mass to be driven. The mass to be driven is integrally formed with a plurality of plate-shaped resilient vibratory pieces annularly arranged on the end face opposite to the oscillator and axially extending at a predetermined angle of inclination relative to the axis of the mass to be rotated, the vibration disc and vibratory pieces being located so as to come in contact at the end portions thereof, whereby vibratory displacement of the supersonic oscillator is transformed into rotational movement of the mass by way of flexible deformation of said vibratory pieces. Alternatively, the aforesaid plate-shaped resilient vibratory pieces may be formed integrally with the vibration disc secured to the supersonic oscillator.

In accordance with a second embodiment of the present invention, a plurality of supersonic oscillators are annularly arranged and located so as to come in contact with the vibratory pieces, wherein operational phases of the respective supersonic oscillators lag each other by a predetermined phase angle. Thus, even and smooth rotation is ensured for the mass. Also in the case of this embodiment, the vibratory pieces may be formed integrally with the vibration disc secured to the supersonic oscillator.

Further, in accordance with a third embodiment of the present invention, there is proposed a supersonic vibration driven motor essentially comprising a plurality of supersonic oscillators linearly arranged and connected one after another with the aid of supporting members, and a mass to be linearly driven by said supersonic oscillators, wherein each supersonic oscillator is provided, at its face toward the mass, with a vibration disc on whose end face is integrally formed a plurality of plate-shaped resilient vibratory pieces which are spaced apart and inclined at a predetermined angle and arranged linearly, and the mass to be linearly driven and said vibratory pieces are located so as to come in contact, whereby vibratory displacement of the supersonic oscillators is transformed into linear movement of the mass by flexible deformation of said vibratory pieces.

Thus it is an object of the present invention to provide a supersonic vibration driven motor device which is different from the conventional motor device in structure and function and is designed and constructed with a smaller size and lighter weight owing to the arrangement whereby vibratory energy of supersonic oscillators is transformed into rotational or linear movement of a mass to be driven by way of flexible deformation of vibratory pieces.

It is another object of the present invention to provide a supersonic vibration driven motor device which is simple in structure and inexpensive to manufacture.

Other objects and advantageous features of the present invention will be readily apparent from the following description with reference to the accompanying drawings.

BRIEF DESCRIPTION OF THE ACCOMPANYING DRAWINGS

Now the present invention will be described in more detail with reference to the accompanying drawings which illustrate the preferred embodiments of the invention, in which.

Figure 4:
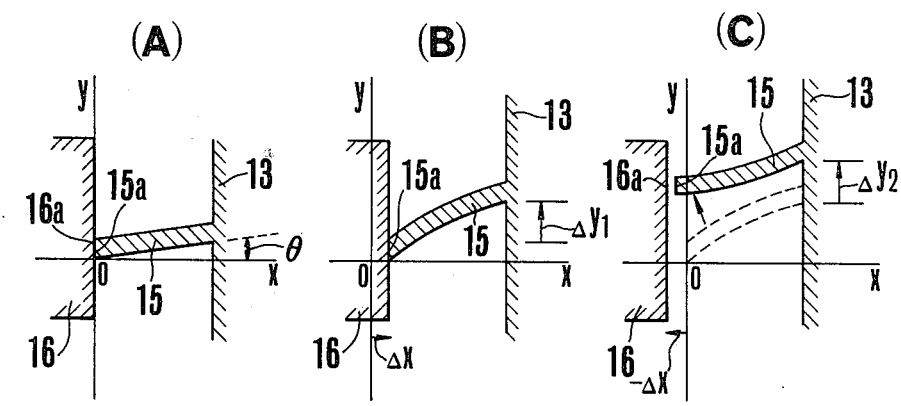

FIGS. 4(A) through (C) are partial schematic illustrations of the vibration disc of the supersonic oscillator and a vibratory piece on the driven body respectively, shown in enlarged scale for facilitating understanding of the principle of operation of the motor device in accordance with the present invention.

Figure 5:
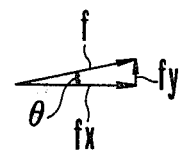

FIG. 5 is a diagrammatic illustration of a force angle, in which the compressive force imparted to the vibratory piece due to the vibratory displacement of the vibration disc is reduced to two components in the X direction and Y direction.

Figure 6:
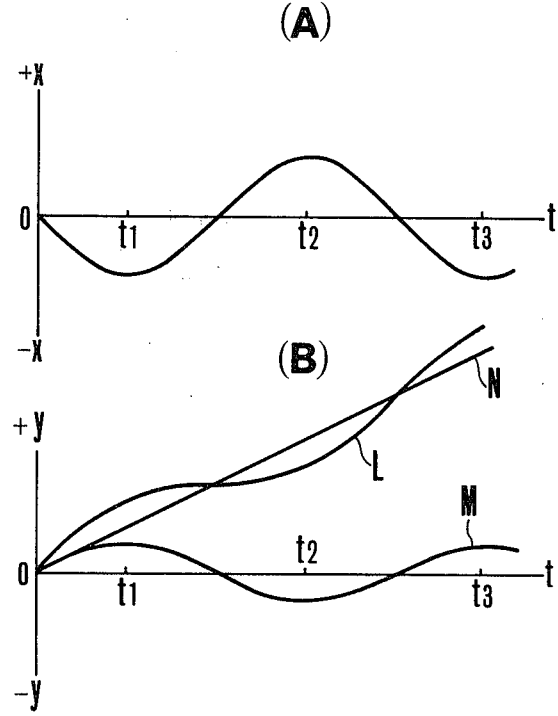

FIG. 6(A) is a diagram illustrating the relation between displacement of the vibration disc of the supersonic oscillator and time.

FIG. 6(B) is another diagram illustrating the movement L of a vibratory piece and the movement N of the driven body, that is, the rotor, as a function of time.

FIG. 7(A) is a schematic sectional view of the motor device in accordance with another embodiment of the invention.

Figure 7:
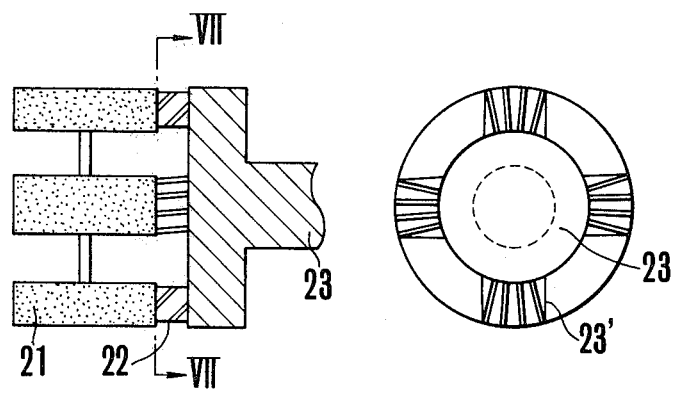
Figure 8:
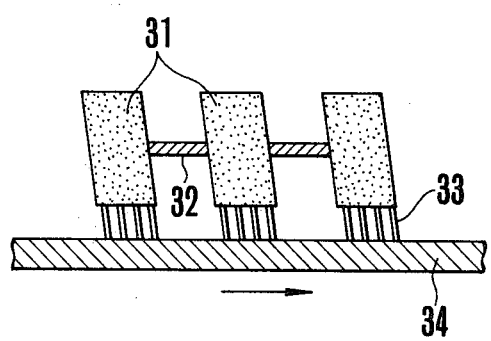

FIG. 7(B) is a front view of the driven rotor, taken along line VII—VII in FIG. 7(A) and seen in the direction designated by arrow marks, and FIG. 8 is a partial schematic sectional view of the motor device in accordance with another embodiment of the invention.

DETAILED DESCRIPTION OF THE PREFERRED EMBODIMENTS OF THE INVENTION

Figure 1:
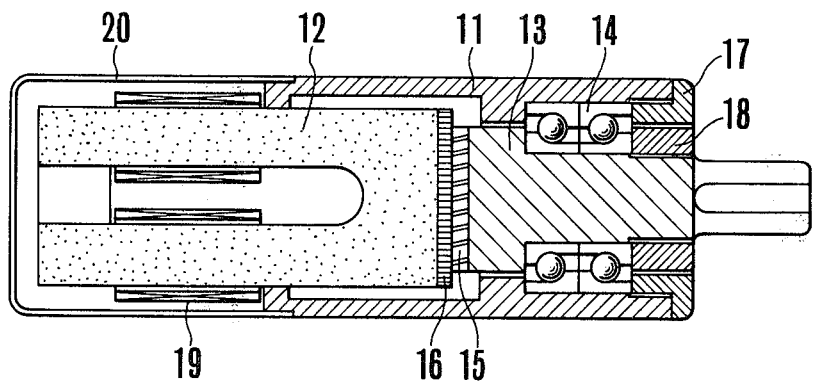
FIG. 1 is a sectional view of a supersonic vibration driven motor device in accordance with the first embodiment of the invention, sectioned in the longitudinal direction.

In FIG. 1 the reference numeral 11 designates a motor casing in which a supersonic vibrator 12 is disposed so as to be vibratively displaced to both the left and the right. At the right part of said casing 11, a rotor 13 is rotatably arranged between ball bearings 14. As is apparent from the drawing, said supersonic oscillator 12 and rotor 13 are located such that the right end face of the oscillator faces the left end face of the rotor. Specifically, the rotor 13 to be driven is integrally formed at the left end with a plurality of vibratory pieces 15, said vibratory pieces 15 axially protruding at a predetermined angle of inclination relative to the axis of the rotor 13, while a vibration disc 16 is secured to the right end face of the supersonic oscilator 12.

Said vibration disc 16 and said vibratory pieces 15 are located such that the former is brought into contact with the end faces of the latter. The reference numeral 17 designates bearing tightening threads, the reference numeral 18 denotes a retaining nut for the rotor 13, the reference numeral 19 denotes an electromagnetic coil, and the reference numeral 20 denotes a casing cover.

Figure 2:
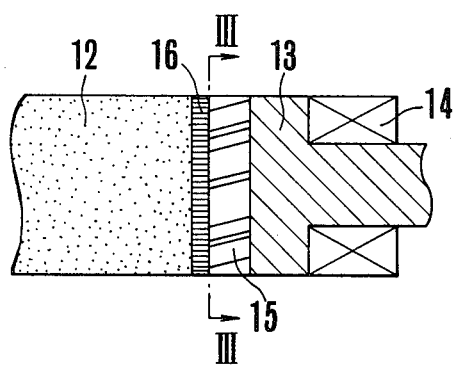
FIG. 2 is a partial sectional view of the motor device in FIG. 1, particularly illustrating a significant part thereof in a larger scale than that of FIG. 1.

In FIG. 2 a significant portion of the motor device in accordance with the invention is schematically illustrated in a considerably larger scale. A plurality of vibratory pieces 15, integrally protruding from the left end face of the rotor 13, are brought in contact with the vibration disc 16 secured to the right end face of the supersonic oscillator 12. The vibratory pieces 15 obliquely extend at a predetermined angle of inclination relative to the axis of the rotor 13 which is rotatably supported by bearing means 14, such as ball bearings or the like.

Figure 3:
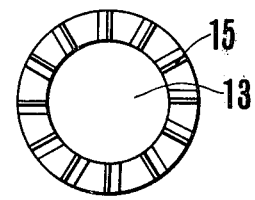
FIG. 3 is a front view of the driven rotor, taken along line III—III in FIG. 2 and seen in the direction designated with arrow marks.

Now a typical method for producing the plurality of vibratory pieces 15 will be described. First, a circular recess having a diameter smaller than the outer diameter of a metal rod is bored to a predetermined depth, and then the resultant annular portion is subjected to a slotting operation at a predetermined angle of inclination relative to the central axis. As a result, the required vibratory pieces are obtained as illustrated in FIGS. 1 to 3. In particular, FIG. 3 is a front view of vibratory pieces 15 produced in the above-described manner, taken along line III—III in FIG. 2 and seen in the direction designated by arrow marks. It will be readily understood that the vibratory pieces are located at a certain distance from each other along the annular portion of the rotor 13. In the case of the embodiment illustrated in FIGS. 1 and 2, the slotting operation is performed in the direction extending from the upper right to the lower left. Alternatively, it is possible to perform the slotting operation in the opposite direction, that is, in the direction extending from the upper left to the lower right, whereby the rotor will be rotated in the opposite direction.

Next, the principles of operation of the motor device in accordance with the present invention will be described. First, as illustrated in FIG. 4(A), it is assumed that an origin 0 for an x - y coordinate system is located at the lower part of the left end face 15a of the vibratory piece 15 against which the right end face 16a of the vibration disc 16 comes in abutment. In this connection it is to be noted that an angle $\theta$ of inclination relative to the axis of the rotor 13 should be chosen smaller than the friction angle between the vibration disc 16 and the vibratory piece 15.

As the vibration disc 16 starts to vibrate and displaces by a distance $\Delta X$ in the X direction, the end face 15a of the vibratory piece 15 is compressively displaced in the positive X direction. Due to the fact that the rotor 13 is immobile in the axial direction, a component $f_y$ in the Y direction is derived from the compressive force f imparted to the vibratory piece 15, corresponding to the displacement $\Delta X$ in the X direction, as illustrated in FIG. 5. The vibratory piece 15 is thus displaced away from the axis of the rotor 13 in the Y direction. The displacement of the vibratory piece 15 in the Y direction is designated by $\Delta Y_1$. (see FIG. 4(B)).

Next, as the vibration disc 16 is displaced by a distance $\Delta X$ in the negative X direction in the next operational phase, the right end face 16a of the vibration disc 16 parts from the left end face 15a of the vibratory piece 15, causing the frictional force therebetween to disappear. Thus the portion 15a of the vibratory piece 15 is flexibly deformed and thereby displaced in the positive Y direction in accordance with the characteristic frequency of the vibratory piece 15, whereby the rotor 13 is rotated by $\Delta Y_2$ in the Y direction due to its own inertial force. (see FIG. 4(C)). As the vibration disc 16 continues to vibrate, the relation between the vibration disc 16 and the next vibratory piece 15 is restored to the original state as illustrated in FIG. 4(A). By repeating the above-described operational steps, the rotor 13 continues to be rotated.

FIGS. 6(A) and (B) are intended to graphically illustrate the above-described operational steps of the motor device in accordance with the invention. FIG. 6(A) shows the movement of the vibration disc 16 relative to time, while FIG. 6(B) shows the movement L of the vibratory piece 15 at its left end portion 15a. It is to be noted that the aforesaid movement L of the vibratory piece 15 is composed of the amplitude M of the vibratory piece 15 itself and the movement N of the rotor 13. In both graphs, the period from time $t_1$ to time $t_2$ on the abscissa represents an operational step during which the vibration disc 16 comes in contact with the vibratory piece 15, while the period from $t_2$ to $t_3$ represents the next operational step during which the vibration disc 16 moves away from the vibratory piece 15. During the former period of time, the rotor is operatively driven, while during the latter period of time, the rotor is rotated only by inertial force without any power supply.

As mentioned abpve. the principle of the present invention lies in the fact that the vibratory movement of the vibration disc 16 secured to the supersonic oscillator is transformed into rotational movement of the rotor 13 by way of flexible deformation of the vibratory pieces 15 which have excellent resilience, wherein the displacement of the vibratory pieces 15 located remote from the axis of the rotor 13 produces rotational torque on the rotor, so that the required continuous rotation of the latter is achieved.

It is to be noted that in FIGS. 1 to 4 the present invention has been described with the motor device in which the vibratory pieces 15 are formed integrally with the rotor 13 to be driven, but it shouldn't be limited only to this arrangement. Said vibratory pieces 15 may, for example, be integral with the vibration disc 16 secured to the supersonic oscillator 12.

FIGS. 7 and 8 schematically illustrate a motor device in accordance with other embodiments of the invention, respectively. In FIG. 7(A), the reference numeral 21 designates a plurality of supersonic oscillators, each of which is integrally formed with vibratory pieces 22. Said vibratory pieces 22, axially extending at a predetermined angle of inclination, are brought in contact against the left end face of a rotor 23 to be driven. The vibratory pieces 22 are arranged at a predetermined angle of inclination relative to the axis of the rotor 23 to be driven in the same manner as in the case of the embodiment illustrated in FIG. 1. FIG. 7(B) is a sectional view of the motor device, taken along line VII—VII in FIG. 7(A) as seen in the direction designated by the arrow marks. Said vibratory pieces 22 are located so as to come in contact with an annular peripheral portion 23' of the rotor 23, whereby vibratory movement of the supersonic oscillators 21 in the axial direction causes the rotor 23 to be rotationally driven by way of flexible deformation of the vibratory pieces 22 in accordance with the principle illustrated in FIG. 4. In this embodiment, the respective supersonic oscillators 21 are located in such a manner that, during driving operation of the rotor, they are not actuated in the same phase, but with a certain relative phase displacement between them, whereby smooth rotation is ensured for the rotor 23.

In this embodiment, the vibratory pieces 22 are formed integrally with a vibration disc (not shown) secured to the supersonic oscillators 21. Alternatively, the vibratory pieces 22 may be integral with the rotor 23 in the same manner as in the case of the first embodiment illustrated in FIGS. 1 through 4.

Further referring to FIG. 8 which illustrates another embodiment of the invention, a plurality of supersonic oscillators 31 are shown to be linearly disposed one after another, each being connected to the adjacent oscillator with the aid of support rods 32. The respective supersonic oscillators 31 are integrally formed, at their lower ends, with vibratory pieces 33 which extend at a predetermined angle of inclination. As the supersonic oscillators 31 vibrate in the vertical direction, the vibratory pieces 33 are flexibly deformed, and a linearly extending mass 34, in the form of a plate or rod, is thereby linearly driven in the direction designated by an arrow mark.

Thus the supersonic vibration driven motor device in accordance with the present invention has been described with respect to its principle of operation and in reference to its preferred embodiments. As is apparent from the above description, it can be concluded that the motor device of the invention is new and unique, since the same is operated in a different manner from conventional motor devices, that is, in such a manner that supersonic vibratory energy is transformed into rotational or linear movement by way of flexible deformation of vibratory pieces. The motor device of the present invention is capable of generating high rotational force as well as linear driving force at a higher operative speed with a smaller structure. Finally, it is to be added that the motor device of the invention can be put to use in substantially the same fields of application as those of conventional ones.

It should, of course, be understood that the present invention isn't limited only to the above-described embodiments; it may be changed or modified in a suitable manner without any departure from the spirit and scope of the invention.

What is claimed is:

1. A supersonic vibration driven motor device comprising:
    a supersonic oscillator; and
    a mass to be rotationally driven by way of supersonic vibration,
    said supersonic oscillator being provided with a vibration disc secured thereto on an end face thereof which is opposite to said mass to be driven;
    said mass to be driven being integrally formed with a plurality of plate-shaped resilient vibratory pieces annularly arranged on an end face thereof opposite to said oscillator and axially extending at a predetermined angle of inclination relative to the axis of the mass to be rotated,
    said vibration disc and vibratory pieces being located so that their respective end portions come in contact with one another,
    vibratory displacement of the supersonic oscillator, in a direction transverse to the face of said mass being transformed into rotational movement of the mass by the flexible deformation of said vibratory pieces, and further including additional supersonic oscillators, all of the oscillators being coupled to one another with the aid of supporting members and located so as to come in contact with the vibratory pieces formed integrally with the mass to be driven and arranged on the end face of the supersonic oscillator in such a manner that operational phases of the respective oscillators lag each other by a predetermined phase angle so as to obtain even and smooth rotation of the mass.

2. A supersonic vibration driven motor device as set forth in claim 1, wherein the vibratory pieces formed integrally with the mass to be driven are inclined in the forward direction relative to movement of the mass, as seen from the supersonic oscillator.

3. A supersonic vibration driven motor device as set forth in claim 2 wherein the angle of inclination of the vibratory pieces relative to a plane perpendicular to the end face of the mass to be driven is predetermined to be smaller than the friction angle between the vibration disc secured to the supersonic oscillator and the vibratory pieces.

4. A supersonic vibration driven motor device as set forth in claim 1 wherein the angle of inclination of the vibratory pieces relative to a plane perpendicular to the end of the mass to be driven is predetermined to be smaller than the friction angle between the vibration disc secured to the supersonic oscillator and the vibratory pieces.

5. A supersonic vibration driven motor device comprising:
    a supersonic oscillator; and
    a mass to be rotationally driven by way of supersonic vibration,
    said supersonic oscillator being provided, at a face thereof toward the mass, with a vibration disc secured thereto,
    said vibration disc being integrally formed on its end face with a plurality of plate-shaped resilient vibratory pieces annularly arranged and opposing said mass and axially extending at a predetermined angle of inclination relative to the axis of the mass to be rotated, said vibratory pieces and mass to be driven being located so that their respective end portions come in contact with one another, vibratory displacement of the supersonic oscillator in a direction transverse to the face of said mass being transformed into rotational movement of the mass by the flexible deformation of said vibratory pieces, and further including additional oscillations and vibratory pieces, the vibratory pieces being formed integrally with vibration discs secured to supersonic oscillators which are annularly arranged and coupled to one another with the aid of supporting members and being located so as to come in contact with the mass to be driven in such a manner that operational phases of the respective oscillators lag each other by predetermined phase angle so as to obtain even and smooth rotation of the mass.

6. A supersonic vibration driven motor device comprising:

a plurality of supersonic oscillators linearly arranged and coupled to one another with the aid of supporting members; and a mass in the form of a plate or a rod to be linearly driven by said supersonic oscillators, each supersonic oscillator being provided with a vibration disc integrally formed with a plurality of plate-shaped resilient vibratory pieces which are extended at a predetermined angle of inclination and arranged in linear alignment, said mass to be linearly driven having a face and vibratory pieces being located so that their respective end portions come in contact with said face, vibratory displacement of the supersonic oscillators in a direction transverse to the face of said mass being transformed into linear movement of the mass by way of flexible deformation of said vibratory pieces.

7. A supersonic vibration driven motor device as set forth in claim 5 or 6, wherein the vibratory pieces formed integrally with the vibration disc secured to the supersonic oscillator are inclined in the forward direction relative to movement of the mass, as seen from the supersonic oscillator.

8. A supersonic vibration driven motor device as set forth in claim 7, wherein the angle of inclination of the vibratory pieces relative to a plane perpendicular to the face of the mass to be driven is predetermined to be smaller than the friction angle between the mass to be driven and the vibratory pieces.

9. A supersonic vibration driven motor device as set forth in claim 5 or 6 wherein the angle of inclination of the vibratory pieces relative to a plane perpendicular to the face of the mass to be driven is predetermined to be smaller than the friction angle between the mass to be driven and the vibratory pieces.

* * * * *